United States Patent
Hans et al.

(10) Patent No.: US 8,494,980 B2
(45) Date of Patent: Jul. 23, 2013

(54) METHOD FOR THE COMPUTER-ASSISTED EXPLORATION OF STATES OF A TECHNICAL SYSTEM

(75) Inventors: Alexander Hans, München (DE); Daniel Schneegaβ, Amsterdam (NL); Anton Maximilian Schäfer, München (DE); Volkmar Sterzing, Neubiberg (DE); Steffen Udluft, Eichenau (DE)

(73) Assignee: Siemens Aktiengesellschaft, München (DE)

( * ) Notice: Subject to any disclaimer, the term of this patent is extended or adjusted under 35 U.S.C. 154(b) by 579 days.

(21) Appl. No.: 12/740,500

(22) PCT Filed: Sep. 29, 2008

(86) PCT No.: PCT/EP2008/063009
§ 371 (c)(1), (2), (4) Date: Apr. 29, 2010

(87) PCT Pub. No.: WO2009/056416
PCT Pub. Date: May 7, 2009

(65) Prior Publication Data
US 2010/0241243 A1    Sep. 23, 2010

(30) Foreign Application Priority Data

Oct. 31, 2007  (DE) .......................... 10 2007 052 122
Feb. 6, 2008   (DE) .......................... 10 2008 007 700

(51) Int. Cl.
*G06F 15/18*    (2006.01)
*G06F 17/00*    (2006.01)
*G06N 5/02*     (2006.01)
*G05B 11/01*    (2006.01)
*G05B 13/02*    (2006.01)

(52) U.S. Cl.
USPC .................. 706/12; 706/14; 706/47; 700/21; 700/33

(58) Field of Classification Search
None
See application file for complete search history.

(56) References Cited

U.S. PATENT DOCUMENTS 5,448,681 A * 9/1995 Khan .............................. 706/23
5,857,321 A * 1/1999 Rajamani et al. ............ 60/39.27
(Continued)

FOREIGN PATENT DOCUMENTS

| DE | 10 2007 001 025 A1 | 7/2008 |
| EP | 1 016 981 A1 | 7/2000 |
| JP | 2003287214 A | 10/2003 |

OTHER PUBLICATIONS

Neuneier, R. (1998). Enhancing Q-learning for optimal asset allocation. In M. I. Jordan, M. J. Kearns, & S. A. Solla (Eds.), Advances in neural information processing systems (vol. 10). Cambridge, MA: The MIT Press.*

(Continued)

*Primary Examiner* — Kakali Chaki
*Assistant Examiner* — Daniel Pellett (57) ABSTRACT

A method for the computer-assisted exploration of states of a technical system is provided. The states of the technical system are run by carrying out an action in a respective state of the technical system, the action leading to a new state. A safety function and a feedback rule are used to ensure that a large volume of data of states and actions is run during exploration and that at the same time no inadmissible actions occur which could lead directly or indirectly to the technical system being damaged or to a defective operating state. The method allows a large number of states and actions relating to the technical system to be collected and may be used for any technical system, especially the exploration of states in a gas turbine. The method may be used both in the real operation and during simulation of the operation of a technical system.

16 Claims, 3 Drawing Sheets

U.S. PATENT DOCUMENTS

| | | | | |
|---|---|---|---|---|
| 7,047,224 | B1* | 5/2006 | Neuneier et al. | 706/12 |
| 7,107,107 | B2* | 9/2006 | Morikawa et al. | 700/31 |
| 8,095,479 | B2* | 1/2012 | Sekiai et al. | 706/12 |
| 2003/0074338 | A1 | 4/2003 | Young et al. | |
| 2006/0195409 | A1 | 8/2006 | Sabe et al. | |

OTHER PUBLICATIONS

Alexander Hans, Daniel Schneegass, Anton Maximilian Schaefer and Steffen Udluft "Sichere Exploration für Reinforcement-Learning-basierte Regelung", 17. Workshop Computational Intelligence DES VDI/GMA-FA 5.14, "Computational Intelligence" and the GI-FG "Fuzzy-Systeme und Soft-Computing" in Bommerholz near Dortmund, Dec. 6-7, 2007. Universitätsverlag Karlsruhe, [Online] XP002517778 Found on: URL: http://www.inb.uni-luebeck. de:8084/~sc hneega/sichere_exploration.pdf> [found on Mar. 3, 2009]; Others.

Anton Maximilian Schaefer et al, "A Neural Reinforcement Learning Approach to Gas Turbine Control" Neural Networks, 2007. IJCNN 2007. International Joint Conference on, IEEE, Piscataway, NJ, USA, Aug. 1, 2007, pp. 1691-1696; Others.

* cited by examiner

METHOD FOR THE COMPUTER-ASSISTED EXPLORATION OF STATES OF A TECHNICAL SYSTEM

CROSS REFERENCE TO RELATED APPLICATIONS

This application is the US National Stage of International Application No. PCT/EP2008/063009, filed Sep. 29, 2008 and claims the benefit thereof. The International Application claims the benefits of German application No. 10 2007 052 122.9 DE filed Oct. 31, 2007 and No. 10 2008 007 700.3 DE filed Feb. 6, 2008. All of the applications are incorporated by reference herein in their entirety.

FIELD OF INVENTION

The invention relates to a method for computer-assisted exploration of states of a technical system as well as to a corresponding computer program product.

BACKGROUND OF INVENTION

Various methods are known from the prior art in which the dynamic timing behavior of a technical system is optimized with computer assistance while taking account of prespecified criteria. Examples of such methods are learning methods which, on the basis of known data of the technical system, learn an optimized adjustment of the system. In such cases the technical system is described by states which represent measurable state variables of the technical system, for example physical variables such as pressure, temperature, power and the like. Furthermore actions are defined in the technical system which describe the modification of specific adjustment variables at the technical system, such as the modification of valve settings, increasing pressure and the like. The state of the technical system is put into a new follow-up state by an action. Known learning methods in such cases learn an optimum action selection rule which for each state of the technical system defines the optimum action for putting the system into a new state. Each action is typically awarded in such cases either a reward or a punishment, especially one including a cost function, with an optimum dynamic behavior of the technical system able to be achieved with the aid of the rewards.

The basis for the appropriate determination of an optimum behavior of a technical system in this case is a good database in the form of a well-explored state space of the technical system. This means that a plurality of appropriate data about the technical system must be present in the form of states, actions and follow-up states. In this case the problem arises that during the exploration of the state space, for determining a suitable database, states can be assumed which are to be classified as unsafe, i.e. which under some circumstances can lead directly or indirectly to the technical system being damaged or to its malfunctioning.

SUMMARY OF INVENTION

The object of the invention is therefore to create a method for computer-assisted exploration of states of a technical system with which the assumption of unsafe states can be avoided and simultaneously for the state space to be run so that a good database for executing a subsequent method for determining an optimum adjustment of the technical system is created.

This object is achieved by the independent claims. Further developments of the invention are defined in the dependent claims.

In the inventive method consecutive states of the technical system are run by an action which leads to a new state being executed in the respective state of the technical system. In such cases a safety function and a backup policy are used. With the aid of the safety function the system determines, before executing actions which lead to unknown, previously not yet run states, whether the respective action is a permissible or impermissible action in the technical system, with the action only being executed if it is permissible. The safety function thus guarantees that unknown states will only be explored if they are classified as safe in accordance with predetermined criteria. As well as a safety function a backup policy is also used in the inventive method, wherein on reaching unknown, previously not yet run states of the technical system, the subsequent actions will be selected based on this backup policy. The backup policy is used to return the states of the technical system to known states. With this backup policy it is guaranteed that the states of the technical system run back from a new unknown state into a known state area again. This avoids the states of the technical system moving through actions into state regions which can lead to damage to the technical system.

The advantage of the inventive method is that, by using a safety function and a backup policy, suitable mechanisms are provided with which a comprehensive exploration of the state space is achieved with the danger of impermissible actions being executed very largely being avoided.

In a preferred embodiment of the inventive method the impermissible actions are characterized such that, on execution of an impermissible action, there is a probability of one or a probability of greater than zero of the technical system reaching a state which leads to an undesired or incorrect operating state of the technical system either directly after execution of the impermissible action or indirectly after execution of further actions. An undesired or incorrect operating state in this case is especially a state which results in damage to or destruction of the technical system.

In a further embodiment of the inventive method the backup policy will also be applied if states are reached in the technical system in which an action to be executed is classified as impermissible in accordance with the safety function. This further improves the safe exploration of the state space.

In a further embodiment the actions executed will each be evaluated as a function of the state in which the action is executed and the new state achieved by the action with a reward, with this reward in particular also being used, after the exploration of the states, to learn a method for adjustment or control of the technical system based on the states run and the actions evaluated. Preferably an action is also categorized as impermissible with the aid of this reward, with actions for which the rewards are less than a predetermined value being classified as impermissible.

In a further embodiment of the inventive method the safety function is also learned based on the evaluations of the actions determined. Preferably in this case pairs run consisting of a state and the actions executed in the state are assigned the minimum reward in each case, which after the execution of the action and with subsequent running of the backup policy occurs for an action, with the safety function being determined based on the minimal reward and with the safety function determining an impermissible action when the minimum reward is smaller than a prespecified value. This ensures in a suitable manner that actions executed in a state lead neither directly nor indirectly to an undesired or faulty operating state of the technical system.

The safety function is determined in a preferred variant of the invention with a function approximator which approximates the minimum rewards based on a local extrapolation around the state currently to be changed with an action. In particular the function approximator carries out a local-linear and/or local-quadratic extrapolation.

The backup policy used in accordance with the invention can in one embodiment be a policy predetermined for the technical system. In particular the backup policy can be based on an adjuster of the technical system already present.

Instead of or in addition to a predetermined rule, the backup policy can also be determined with a reinforcement learning process, taking account of the rewards of the actions. The reinforcement learning process is preferably based in such cases on an optimality criterion in accordance with which the minimum of the expected value of all future rewards is maximized. In this way it is ensured that the backup policy rapidly returns the system to the states that are known and safe.

In order to achieve an essentially complete exploration of states by executing all possible actions in the states, in an especially preferred embodiment the states on being run are consecutively allocated the following categories:

i) If the states are changed on the basis of the backup policy, an unknown, previously not run state reached by an action is assigned the category which is assigned to the state before the action is run.

ii) In all other cases an unknown, previously not run state reached by an action is assigned a category which follows the category which is assigned to the state before the action is run.

The states are preferably run in accordance with categories such that in one category initially all possible actions to be carried out will be explored and there is then a transition to the next category. The term "explore an action" means in this context that the action is either executed or is classified as impermissible.

In a preferred embodiment, when categories are used, a graph-based pathfinding method is used for running the states and possible actions. In this method a graph is constructed while the states are being run of which the nodes correspond to the states run and of which the edges correspond to the actions executed and in which, for each node, the category of the corresponding state is stored, or whereby on reaching a state in which all possible actions have already been explored, i.e. executed and/or classified with the safety function as impermissible a search is made in the graph for a path to a state in the same category in which actions can still be explored and whenever such a path is found this state is reached via this path. In the event of no path to a state in the same category being found in which there are still actions to be explored, the states of the subsequent category are run.

As an alternative or in addition to a graph-based pathfinding method, a reinforcement learning method can be used for pathfinding. In this case the states of a category are run with the reinforcement learning method based on a reward function, whereby in accordance with the reward function, an action is allocated a reward if it leads to a state in the category just executed in which the exploration of a least one action is still possible. Preferably in the reinforcement learning method an action selection rule is updated after running a predetermined number of states, whereby the newly added actions and the respective state in which the respective newly added action is executed as well as the new state achieved by the action are taken into account in the updating.

In order also to process large state spaces with the inventive method, in a preferred embodiment in the graph-based learning method and/or in the reinforcement learning method similar states of the technical system are grouped into common clusters.

When categories are used the backup policy will not only be applied on reaching unknown states but also on reaching states of a category following the category currently to be run. In a further embodiment the states in accordance with the backup policy run until such time as a state of the category currently to be run is reached.

With the use of categories the method is preferably initiated such that initially, without taking account of the safety function, the states in accordance with the backup policy will be run and in such cases the states will be assigned the same category, with the states being run until such time as a specific quantity of states is no longer left and whereby subsequently taking into account the safety function, the system moves to an unknown previously not yet run state, with this state being assigned to the subsequent category.

The inventive method is especially employed in real operation of the technical system. Where necessary the method can also be used in a simulation of the operation of the technical system.

In an especially preferred embodiment the method is used for exploration of states of a gas turbine. The states of the gas turbine and/or the actions assigned to the states preferably include one or more of the following variables:

Overall power of the gas turbine; fuel supply to the gas turbine; one or more pressures and/or temperatures in the gas turbine or in the environment of the gas turbine; the humming of the gas turbine; combustion chamber accelerations in the gas turbine; one or more setting parameters on the gas turbine, especially valve settings and/or fuel ratios and/or inlet guide valve settings.

As well as the method described above, the invention further relates to a computer program product with program code stored on a machine-readable medium for executing the inventive method when the program runs on a computer.

BRIEF DESCRIPTION OF THE DRAWINGS

Exemplary embodiments of the invention are explained in detail below with reference to the enclosed figures.

The figures show.

DETAILED DESCRIPTION OF INVENTION

The forms of embodiment of the inventive method described below relate to the exploration of a state space consisting of a plurality of states of a technical system whereby, based on so-called reinforcement learning, an optimum action selection rule is to be learned with reference to predetermined states. In accordance with this rule, in the simulation of the operation of the technical system or in real operation an optimum action is selected in a suitable manner, starting from a state of the technical system, which leads to the next stage of the technical system. With the action selection rule the operating states of the technical system are selected in the optimum manner in accordance with predetermined criteria, for example the states can be selected so that the best level of efficiency of the technical system or the lowest wear on the technical system occurs.

In the forms of embodiment described here the optimum action selection rule is described with the aid of a so-called reward function which allocates a reward to the action executed as a function of the state in which the action is executed as well as of the subsequent state resulting therefrom, $R_{s,s'}^a$ which corresponds to a reward as defined in the claims.

Reinforcement learning has long been known from the prior art and represents one approach to automated learning for resolving optimum control problems. As already explained above, with this reinforcement learning (also referred to as the RL method below) an action selection rule (also referred to below as a policy) is identified, which a so-called agent which executes the action controls in the optimum manner within a predetermined environment. In the form of embodiment described here the policy is defined in a Markov decision process consisting of a state space S, a set of actions A and a dynamic. The latter is produced from the transition probabilities $P_{s,s'}^a : S \times A \times S \to [0,1]$ from the current state s to the new follow-up state s' as well as the action a, which leads to the follow-up state s'. With each corresponding transition the agent receives the reward already mentioned above. The rewards likewise follow a distribution and are only deterministic in special cases so that R represents a function. As a rule one is interested in maximizing the discounting value function $$V^\pi(s) = E_s^\pi \left( \sum_{i=0}^\infty \gamma^i R_{s(i),s(i+1)}^{\pi(s(i))} \right)$$

with the discounting factor $0 < \gamma < 1$ for all states s across the policy space $\pi \in \Pi, \pi: S \to A$. As an intermediate step one uses so-called Q functions $$Q^\pi(s,a) = E_s^\pi(R_{s,s'}^a + \gamma Q^\pi(s', \pi(s')))$$

which depend on state and action. $V^* = V^{\pi_{opt}}$ is defined here as the optimum value function and accordingly $$Q^*(s, a) = E_{s'}(R_{s,s'}^a + \gamma V^*(s')) = E_{s'}\left(R_{s,s'}^a + \gamma \max_{a'} Q^*(s', a')\right)$$

as the optimum Q function. The previous equation represented the Bellmann optimality equation known to the person skilled in the art, the solution of which delivers the optimum policy $\pi(s) = \arg \max_a Q^*(s, a)$.

The RL methods described above are able to optimize complex technical systems, such as gas turbines for example, on the basis of a justifiable number of interactions. To implement the above RL method it is necessary that for learning the method there is already a predetermined set of data records in the form of tuples comprising state, action, a follow-up state and reward available, in order to execute the learning based on these data records. The inventive method deals with generating data records for this learning in a suitable manner, with this generation being achieved by an exploration of the state space of the states of the technical system by executing corresponding actions. Since in the exploration of the state space the characteristics of the technical system are not yet known, it is to be ensured that no impermissible actions are executed which are undesirable in the technical system and which in particular can lead to damage to the system. In addition the exploration method should make it possible to run the state space in which a large number of safe states are adopted which do not lead to damaging the technical system. The forms of embodiment described below make such a safe exploration of the state space of a technical system possible.

Two significant components of the methods described below are a safety function and a backup policy. The task of the safety function is to determine whether a state-action pair is safe, while the backup policy is designed to lead back from critical or unknown states into safe and already known states. In order to connect these two components, in the forms of embodiment of the inventive method described below a so-called level-based exploration scheme is used which divides the states into levels of a sequence of consecutive levels.

The safety function used in the method must provide information for a state-action pair about their safety status which can be divided up into the categories "safe", "critical" and "hypercritical". In addition an action can be divided into the categories "fatal" and "not fatal". A non-fatal action for transition from a state s into a state s' is present if the following applies: $R_{s,s'}^a \geq \tau$, with $\tau$ being a predetermined limit value. By contrast an action is fatal if the following applies: $R_{s,s'}^a < \tau$.

A state is categorized as safe if, for all actions a executable in a state, a policy P exists for which the following applies:

$$\forall i : R_{s(i),s(i+1)}^{\pi(s(i))} \geq \tau.$$

A critical state is a state in which there is an action so that with a probability of $P_{s,s'}^a > 0$ hypercritical follow-up state s' will be reached. A hypercritical state in this case is a state, in which for all actions which are executed in the state, also all subsequent policies with which the states can be run lead at some point to a fatal transition. This means that for all actions a in a hypercritical state the following applies:

$$\exists i : R_{s(i),s(i+1)}^{\pi(s(i))} < \tau.$$

From the above definitions of safe, critical and hypercritical it emerges that an agent can be transferred from critical states—with safe executions of subsequent actions—back into safe states. Furthermore an action which is classified as safe (i.e. of which the follow-up state is safe) can always be executed in the exploration of the state space since it always has a reward which is greater than $\tau$. If rewards occur with values below the limit value $\tau$, as a rule this generally leads to damage or to an incorrect operation of the technical system.

A trivial solution of the problem of the safety function consists of defining it in advance. However this would require detailed knowledge about the RL environment, which is generally not available. Therefore it is necessary to learn the safety function from the already existing exploration data, i.e. from observations of state transitions in the form of (s, a, r, s') tuples. In this case r designates the reward which is awarded for the action a, which puts the state s into the state s'.

In the form of embodiment of the invention described below a safety function will be used which avoids unsafe actions which directly or indirectly after their execution lead to a fatal state. To this end the backup policy described further below is taken into account. This policy is always used if, in the explanation of the state space, an unknown, previously not yet run state of the technical system is reached. In this case, based on the backup policy which is generally referred to in the claims as the backup policy, actions are executed such that the system returns to a known, previously run state.

The safety function is implemented in the form of the embodiment described below as a minimum estimation of the rewards (min reward estimation). This estimation consists of estimating the minimum reward that one receives after one has executed the action a in a state s and follows the backup policy. In particular the safety function is determined based on the following two steps.

1. During the exploration min reward samples in the form $(s, a, r_{min})$ are collected. In this case $(s, a)$ designates the execution of the action a in the state s and $r_{min}$ the minimal observed reward on the backup trajectory which is generated by the backup policy subsequent to this transition.

2. On the basis of the samples collected during the exploration a function approximator is learnt which maps from a state-action pair onto the minimum reward to be expected; $R_{min}: S \times A \rightarrow R$.

The min reward samples depend on the backup policy used. In a similar way to how the values of a Q function $Q^\pi(s, a)$ deliver the expected (discounted) sum of the future rewards if action a is executed in the state s and subsequently follows the policy $\pi$, $R_{min}(s, a)$ delivers the minimum reward to be expected if one executes action a in the state s and then follows the backup policy.

The task of the backup policy is to return the agent used in the execution of the method to a known area if the agent can no longer make any secure decision because it has got into a new state in which it cannot sufficiently well estimate the safety of individual actions. The backup policy in this case may not itself lead into critical states. This is for example achieved by the backup policy arriving at a possible stationary point or attempting to stop in a specific area of the state space.

For technical systems in real operation which are already operated without reinforcement learning a new adjuster is often already present which can be used as a backup policy specified in advance provided this adjuster behaves safely and does not lead to fatal transitions. If such an adjuster is not yet present it is necessary to learn a backup policy from already available exploration data, i.e. from already available $(s, a, r, s')$ tuples.

As stated above the safety of actions is expressed via a corresponding reward, with actions with rewards smaller than the limit value $\tau$ corresponding to a fatal transition. In learning the backup policy from exploration data the backup policy must thus take account of the reward. In a possible variant of the invention the backup policy is determined by means of a conventional RL method, with the value function defined at the start now not being used however since the optimum policy determined therefrom is generally not also simultaneously safe. In addition a deliberately optimum and safe policy can be unsafe because of errors in the generalization. In order to make sure of this, instead of the expected value, the sum of the rewards of the expected value of the minimum of the rewards is maximized. The corresponding Bellman optimality equation is then as follows:

$$Q^{m*}(s, a) = \sum_{s' \in S} P^a_{s,s'} \min\left[R^a_{s,s'}, \max_{a' \in A} Q^{m*}(s', a')\right] \quad (1)$$

The discounting factor $\gamma$ is dispensed with in this case since the reformulation of the target function means that the problem of a diverging sum no longer exists.

If one determines a $Q^{m*}$ for a given RL problem that suitably fulfills this equation, a greedy policy $Q^{m*}$ in relation to $\pi^{m*}$ can be determined therefrom, the aim of which is to avoid low rewards. A policy is greedy in this case if it executes the action with the maximum Q value in each state.

Such a max-min Q function which fulfils the above equation (1) can be determined with the dynamic programming from the prior art, in a similar way to the Q function of the optimum policy is also able to be determined. However no unique checkpoint exists here since approximately $Q=-\infty$ is an undesired but permitted solution. The initialization with $Q=\infty$ guarantees the reaching of a correct solution since in the first iteration step the rewards at the minimum are used and not the initial Q values.

To determine the backup policy described above any given RL methods known from the prior art can be used, especially the dynamic programming already mentioned above, a neural fitted Q iteration (NFQ) as well as methods based on recurrent neural networks, which are described for example in patent application DE 10 2007 001 025.9.

In order to create a broadest possible database in the form of a plurality of expiration data, a so-called level-based exploration is employed. This involves a gradual exploration which slowly removes the executing agent from an area of the state space known as safe and initially attempts to collect as many local observations as possible. To this end each state s is allocated a level $l \in N$ (N=set of natural numbers). Starting from the fact that the exploration starts in the safe area, for the starting state $s_0$ the level $l(s_0)=0$ is set. If during the exploration a previously unknown state $s_i$ is encountered its level is set as $l(s_i)=l(s_{i-1})+1$, with $l(s_{i-1})$ corresponding to the level of the predecessor state. If a new state $s_i$, is encountered during following of the backup policy, its level $l(s_i)$ is adopted from the predecessor state $s_{i-1}$, i.e. the following applies: $l(s_i)=l(s_{i-1})$. This is motivated by the fact that following the backup policy does not lead to a worsening of the safety. Based on this level concept, the exploration runs as follows:

Beginning with the level $l(s_0)=0$ each state known in the technical system is allocated a level.

A level $l_c$ currently to be explored is retained, with $l_c=0$ being initialized at the beginning. The aim of the exploration in each case is for a level $l_c$, in all states of which the level corresponds to $l_c$, to execute all actions possible there provided the execution of the action is estimated to be safe. If all states of the current level are completely explored, $l_c$ is increased.

The exploration is continued until such time as an abort criterion is fulfilled, such as for example the complete exploration of the entire area that can be safely explored. In practice this will however frequently be barely able to be implemented, whereby reaching a desired minimum performance is more sensible.

In order to be able to explore in this manner an option of arriving explicitly at states is required. After the agent executing the method after reaching a new state with an increased level follows the backup policy, this agent arrives either sooner or later back in a known state. From there the option of reaching a state of the current level must exist.

Two methods are described below as to how all known states of the level can be reached in a suitable manner and thus all possible actions in a level can be executed.

The first method is a graph-based pathfinding which in deterministic RL problems can find any given known state. This method is based on the idea of constructing a graph during exploration of which the nodes represent states and the edges represent actions executed. As well as the state the level of the state is noted at a node. The method is characterized by the following steps:

If no further action is to be explored in the current state a search is made in the graph for a state of which the level corresponds to the current state to the explored and for which actions that can still be safely explored exist. If no such state is found the current level to be explored is increased and the exploration is stopped.

To find a path from the current state to a state to be explored a breadth first search on the graph is carried out. By executing the actions with which the edges along the path found are labeled one arrives at the destination state from the current state.

The above method is not suitable for technical systems comprising more than a few thousand states. In justifiable computing time only low two-digit levels can be completely explored. Therefore in a preferred form of embodiment of the graph-based pathfinding adjacent states are grouped together in a suitable manner into a cluster. In the context of this graph-based approach a cluster thus corresponds to a node in the graph. This generally violates the Markov condition so that, depending on the application, a suitable compromise between computing outlay and solubility of the problem must be found.

The second method for exploration of the state of a level consists of pathfinding by means of reinforcement learning. This approach can also be used in the stochastic case, conventional RL methods can be used here, for example one of the methods named in relation to learning the backup policy. To this end a Markov decision process is defined, the states of which correspond to the previously defined clusters. One now defines the reward function $R'_{s,s'}{}^a=1$, if $R'$ is the target state and $R'_{s,s'}{}^a=0$ for any other state. An optimum policy is determined for the RL problem defined in this way and this is followed until such time as the desired cluster is reached. It is also possible to define a number of clusters as the target. In this case the policy would attempt to reach the cluster closest to the current cluster.

A form of embodiment of an algorithm is described below which reflects the entire method of pathfinding by means of reinforcement learning. In this case the policy of the reinforcement learning is learned and updated, with the updating of a policy being undertaken after a specific number of actions.

The algorithm for reinforcement learning comprises the following steps:

Default Settings:

At the start a list O of observations is present in the form of (s, a, s') tuples. Z designates the set of the target clusters, i.e. those clusters which are to be reached through the pathfinding and which contain states in which possible actions can still be executed. n designate the number of actions after which the policy for pathfinding is to be updated. m is the maximum number of actions after which a target cluster must be reached (abort criterion).

First of all the method is initialized as follows:
Define reward function $$R'^a_{s,s'} = \begin{cases} 1, \text{ if } s' \in Z \\ 0, \text{ else} \end{cases} \forall (s, a, s') \in S \times A \times S.$$

Define estimation T of the transition probabilities from O.
Solve the RL problem defined by T and R, from which the policy $\pi_\omega$ will be obtained.

Subsequently the policy application for pathfinding is undertaken on the basis of the following steps:
The following is set: c:=0
The following steps are executed in a repetition loop:
Repeat
if c>^c mod n=0 else
Update estimation of T based on O;
Solve the RL problem defined by T and R and obtain updated policy from this $\pi_\omega$
End of the if condition
(The Policy Will be Updated with the Above if Condition.)
The following definitions are specified:
s:=current state;
a:=$\pi_\omega$(s);
Execute the action a and update as follows:
s':=current state;
append (s, a, s') to O;
c:=c+1;
Check whether the maximum number of actions is reached, and do this as follows:
If c=m. then
return "false" (i.e. the pathfinding was unsuccessful):
End of the if condition
Repeat above steps of the repetition loop until the following applies: s'∈Z
If the condition s'∈Z is fulfilled the pathfinding was successful and the value "true" is returned.

Figure 1:
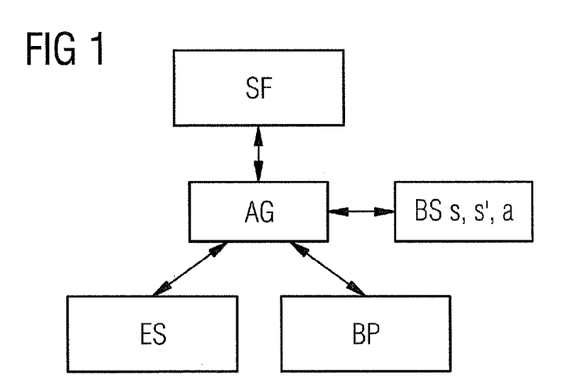
FIG. 1 a schematic diagram which illustrates possible combinations of forms of embodiment of the inventive method.

The possible variants for executing the inventive exploration method described above are illustrated again in the diagram in accordance with FIG. 1. The method is executed by an agent AG and a safety function SF, an exploration strategy ES and also a backup policy BP are used to execute the method. The safety function is approximated in this case with the min reward estimation described above, with a local quadratic approximation being used in particular. Where necessary this approximation can also be executed with a neural network, for example a multilayer perceptron. The exploration strategy ES attempts to execute all possible actions within one level. In such cases the graph-based pathfinding described above or the pathfinding by means of reinforcement learning can be used. An existing adjuster can be used as backup policy BP or the backup policy can be learned with a reinforcement learning method. Fauns of embodiments of the inventive method have been implemented by the inventor and tested on a typical test environment in the form of the known benchmark problem BurnSim. The BurnSim environment is indicated in FIG. 1 by the reference characters BS. Typically in this case the states of the BurnSim problem are designated as s, s' and the actions executed are designated as a. s' is the follow-up state in this case which follows from the state s on execution of an action a.

The BurnSim benchmark problem used for testing the inventive method will be explained below. Fauns of embodiment of the inventive method were implemented for this problem and investigated experimentally. The BurnSim problem is motivated by a problem which really occurs in the regulation of gas turbines. Operating a turbine in the optimum manner means driving it with the highest possible power. In the high power area of the turbine however an undesired dynamic results in the combustion chamber which is also known as "humming". If the humming becomes too great it can lead to the turbine being damaged. For this reason the aim is to operate the gas turbine at the highest possible power and at the same time ensure that the humming does not become too great. The state space of the technical system in the BurnSim problem is two-dimensional and is expressed as follows:

$$S:=\{(f,h)|f\epsilon[0,1),h\epsilon[0,\infty)\}$$

In this case f designates the fuel supply which corresponds directly to the power of the turbine. h stands for the humming. Three actions are allowed, namely reduce fuel supply, keep it and increase it. The action space is thus expressed as follows:

$$A:=\{decrease, keep, increase\}$$

The actions decrease and increase change f by 0.05 in this case, however f must remain within the boundaries [0, 1). The system dynamics, i.e. the change of state from one time step the next during execution of the action a is given by:

$$f_{t+1} = \begin{cases} f_t - 0.05, & \text{if } a = \text{decrease} \land f_t - 0.05 \geq 0 \\ f_t + 0.05, & \text{if } a = \text{increase} \land f_t - 0.05 < 1 \\ f_t, & \text{else} \end{cases}$$

$$h_{t+1} = \begin{cases} 2f_{t+1}h_t, & \text{if } 2f_{t+1}h_t > f_{t+1}/5 \\ f_{t+1}/5, & \text{else} \end{cases}$$

The reward function is only dependent on the follow-up state $S_{t+1}=(f_{t+1},h_{t+1})$ and is expressed as follows:

$$r_t = 4f_{t+1}^2 - \left(\frac{h_{t+1} - f_{t+1}/5}{5}\right)^2$$

The limit value of the safety is set as:

$$\tau = -1$$

This results in the status of the safety as:
$r_1 < -1 \Rightarrow$ State $s_1$ is fatal,
$r_1 \geq -1 \Rightarrow$ State $s_1$ is not fatal.

The aim is to maximize the expected sum of the rewards without ever observing a reward lower than −1. Obviously a reward that is as high as possible is achieved if f is as high as possible and simultaneously h is as low as possible.

Figure 2:
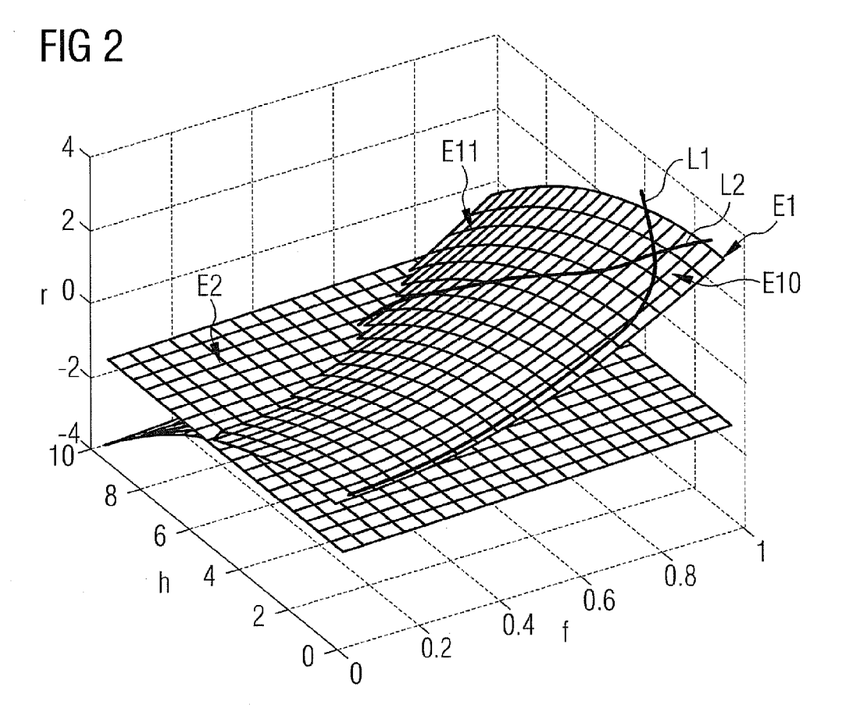
FIG. 2 a three-dimensional diagram of a reward function which is used for testing a form of embodiment of the inventive method based on a benchmark problem.

FIG. 2 illustrates the reward function used. The fuel supply is plotted along the axis f and the humming along the axis h, with higher values standing for a higher fuel supply or a higher humming. The reward is reproduced along the axis r. The curved grid plane E1 in this case represents the reward function as a function of the fuel supply and the humming. Furthermore a limit value E2 is reproduced at which all rewards have the value −1. The rewards of the reward function may never assume values below this limit level since this would lead to a fatal state of the gas turbine. In the plane of the reward function an area E10 is delimited by the line L1, with this area of the reward function never being reached since because of the system dynamics a high fuel supply in combination with low humming is not possible. Furthermore an area E11 of the reward function is delimited by a line L2, with this area being an unsafe area of states, i.e. the adoption of states in the unsafe area necessarily leads at a later point in time to fatal states.

The line L1 in FIG. 2 is obtained by repeatedly executing the action increase beginning at f=0. As can be seen from FIG. 2 the reward also increases in such cases. However this also results in an increase in the humming which has negative effects on the reward. In the interests of a safe exploration the state at the end the trajectory (f=0.95; h =3.35) would already be hypercritical since even if the fuel supply were to be reduced immediately, a reward of −138.45 would not be avoided since the humming is already increasing despite the fuel reduction to 59.14. As already mentioned, the trajectory L1 also marks the limit of the reachable area of the state space. The area below this limit cannot be reached because of the system dynamics. The trajectory L1 already makes a basic difficulty of safe exploration clear: A state must be recognized as unsafe even if this necessarily but only indirectly leads to a fatal state.

As already mentioned, the limit of the safe area is marked in FIG. 2 as line L2. From each state beyond this limit, i.e. with a higher fuel supply and/or higher humming, it is not possible to avoid rewards less than the limit value of −1. Should the agent thus move into this area during exploration it has missed the target of the safe exploration. The BurnSim environment possesses a stationary area at f=0.5. At this point the humming will not be changed. If the action keep is executed there, neither reward nor state change.

In the implementation of the inventive method for the BurnSim problem different variants have been implemented for the safety function, the exploration strategy and the backup policy. The agent with which the individual states are inventively explored keeps the individual components together and coordinates the interaction. The entire process of safe exploration can be summarized as follows:

1. Initialization:
It is assumed that the agent is in a safe area of the state space at the beginning of the exploration. The list of observations is initialized as empty, as is the number of states with actions still to be explored, the current level is set to 0.

2. Initial Following of the Backup Policy:
The backup policy is followed until such time as this has reached a stationary point or a specific area of the state space and no longer leaves it. All states visited in this case are given level 0 and entered into the list of states with actions still to be explored, provided the backup policy has not already executed all possible actions in a state.

3. Exploration Step:
The exploration strategy selects an action to be explored. If in the current state there is no action to be explored (either because all have already been explored or because the level of the current state does not correspond to the current level to be explored), it generates the necessary action through which the agent arrives in a state with actions currently to be explored in order to subsequently select the action to be explored there. Before the execution of the action the agent checks its safety with the aid of the safety function. If the action is estimated as safe it is executed. Otherwise it is marked as unsafe and the backup policy is used to return to the safe area. During execution of the exploration step, in the event of a new, previously unknown state or a known state with a higher level than the state currently to be explored having been reached, the backup policy is also used.

4. Return by Means of the Backup Policy:
If a new state or a state with a higher level than the level currently to be explored is entered, the backup policy is used to return to the known area. In the simplest case the backup policy is used under these circumstances until such time as a state with level 0 has been reached.

5. Level Increase:
When all safe actions have been explored in all states of the current level, the level is increased and the exploration is continued with step 3.

6. Exploration End:
The exploration is ended when all safe actions have been executed in all states or when an abort criterion is fulfilled. This can be the attainment of a maximum level. It is likewise possible, on the basis of the already collected observations, to define an optimum policy and determine its performance. If the policy has reached the desired quality or no longer changes significantly with further observations, the exploration can be ended.

A description of how the safety function is determined for the BurnSim problem is described below. To realize the safety function the min reward function is approximated local-quadratically. For this reason the estimation of the min reward function is realized in a linear manner in the feature space $$\phi_i = (f_i, h_i, f_i^2, h_i^2, f_i h_i, 1)$$

with $f_i$ as a fuel supply and $h_i$ as the humming of the respective transitions i. The feature matrix $$x = \begin{pmatrix} f_1 & h_1 & f_1^2 & h_1^2 & f_1 h_1 & 1 \\ \vdots & \vdots & \vdots & \vdots & \vdots & \vdots \\ f_k & h_k & f_k^2 & h_k^2 & f_k h_k & 1 \end{pmatrix}$$

produced in this case is finally approximated with the method of least squares $w = (X^T X)^{-1} X^T y$ to the observed min rewards $$y = \begin{pmatrix} r_{min,1} \\ \vdots \\ r_{min,k} \end{pmatrix}.$$

By default the ten closest neighbors are included. If the features space is not completely spanned, i.e. if $X^T X$ is not regular, other neighbors are included. The singularity of X is assumed on overwriting of cond($X^T X$)>1000.

In the BurnSim problem in one form of embodiment a standard adjuster known in advance has been used as backup policy. This adjuster delivers the following backup policy:

$$\pi^{backup}(s = (f, h)) = \begin{cases} \text{increase, if } f < 0,425 \\ \text{decrease, if } f > 0,425 \\ \text{keep, else} \end{cases}$$

The adjuster aims for a state below the stationary area in relation to fuel supply and thus leads to a permanent reduction of the humming.

If a backup policy is not known in advance it must be learned from observations already available using the RL method described beforehand which, instead of maximizing the expected value of the sum of the rewards, maximizes the minimum of the rewards. In one form of embodiment implemented for the BurnSim problem, inspired by the idea of so-called apprenticeship learning, the observations in this case are obtained from a trajectory which a so-called teacher has prespecified. This teacher trajectory thus represents an initial dataset consisting of (s, a, r, s') tuples with which the backup policy is learned by an RL method.

Figure 3:
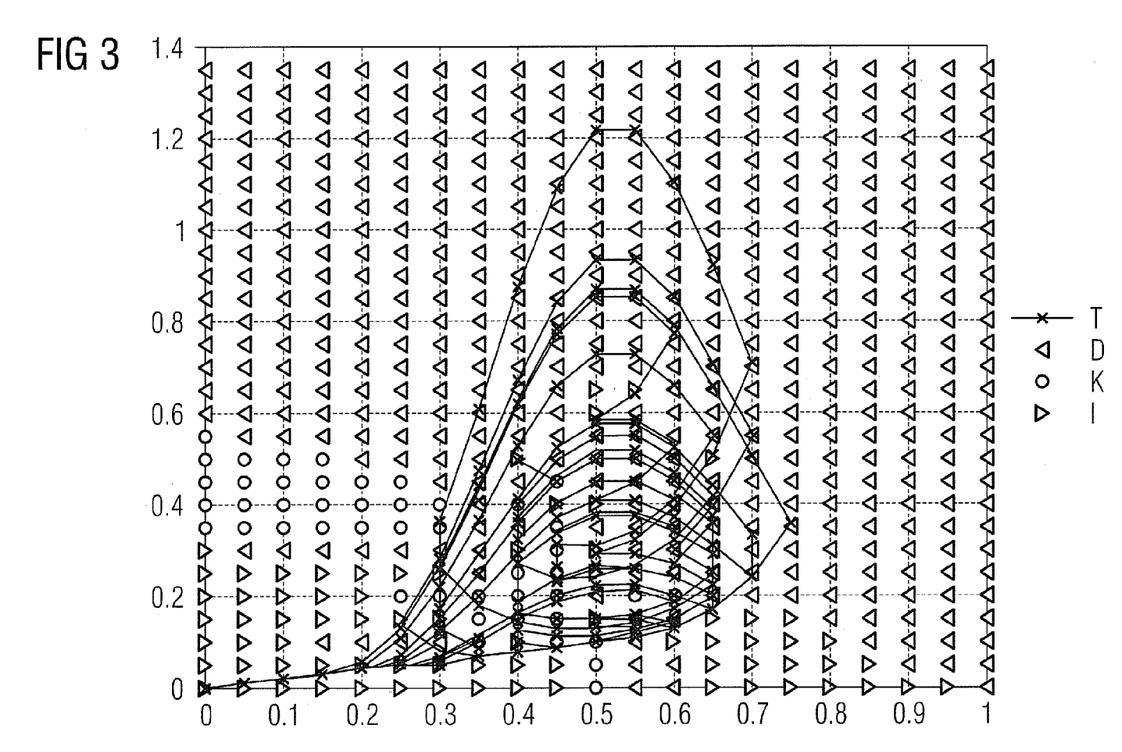
FIG. 3 a diagram which illustrates the learning of a backup policy in accordance with a form of embodiment of the inventive method.

FIG. 3 shows a diagram in which the fuel supply f is plotted along the abscissa and the humming h is plotted along the ordinate. The teacher trajectory T is reproduced in the diagram. This trajectory comprises all observations needed for a safe backup policy. In particular observations in the area to the right off f=0.5 are important so that it can be learned that a fuel supply decreases the safe action there. In addition the learned backup policy is also indicated in FIG. 3 by corresponding actions to be executed in the respective states. In this case the triangles D pointing to the left stand for a reduction of the fuel, the circles K stand for keeping the fuel and the triangles I pointing to the right stand for an increase in the fuel.

Since only a manageable number of states occur in the teacher trajectory it was possible to enter these states as discreet and to determine a table-based Q function using the variation of the Bellman optimality equation (see equation (1)). Non-determined Q values of which the transitions have not been executed by the teacher were also set afterwards to $-\infty$ so that a policy based on the resulting Q function can never execute this action. This is necessary to be able to guarantee safety.

The Q function only contains entries for a few states of the state space. A backup policy must however be able to deliver an action for all states of the entire state space. This has been achieved by a simple closest neighbor generalization for which in a given state s the state $\hat{s}$ is sought in Q for which the Euclidic distance to s is minimal.

As already mentioned, FIG. 3 shows both the teacher trajectory used and also the resulting policy. The Q function only receives entries for the points of the trajectory, for all other points the action is selected on the basis of the Q values of the closest neighbor. It can be recognized that in almost all cases the action is selected which changes the fuel supply in the direction 0.5. If the teacher trajectory for a state contains only one action then the learned policy selects this action for this state and its neighbors even if it is not optimum in the sense of maximizing the minimal rewards. This effect is especially to be observed in the range from $f \leq 0.3$ and $h \approx 0.4$ (action keep) and also in the range from $0.65 \leq f \leq 0.85$ and $h \leq 0.1$ (action increase). In both cases however the incorrect function is not critical: The execution of keep in ranges from $f < 0.5$ leads to a reduction of the humming; the desired increase in the other range specified is not problematic because this area of the state space can never be entered.

In the implementation of the inventive method for the BurnSim problem two realizations of the pathfinding necessary for the exploration strategy have been used. On the one hand a graph-based pathfinding through a breadth first search in a graph has been used and on the other hand the search has been executed by definition and resolution of a pathfinding RL problem.

For the graph-based approach the state space has been artificially reduced in that in the BurnSim implementation after each step the humming has been rounded to the accuracy of 1/50. Thus the RL problem itself has been changed. With real problems the reduction of the state space in this form is not possible.

As an alternative to graph-based pathfinding the pathfinding approach by reinforcement learning has been followed in which the states are aggregated into clusters. The aggregation in such cases has been undertaken as follows:

Since the fuel supply can only be increased and reduced by 0.05 and is always kept in the interval [0,1) the state of the fuel supply can only assume 20 discrete values.

The humming on the other hand assumes continuous values. For aggregation of states the humming has been rounded to an accuracy of 1/50. This does not involve changing the RL problem, the BurnSim problem itself namely remains unchanged. For example the states $s_1 = (f=0.25; h=0.1239)$ and $s_2 = (f=0.25; h=0.1277)$ are two different states in BurnSim. Both belong however to the aggregated state $\hat{s}_1 = (f=0.25; h=0.12)$.

The exploration has been carried out on the states thus aggregated in accordance with the same principle as the graph-based variant.

Figure 4:
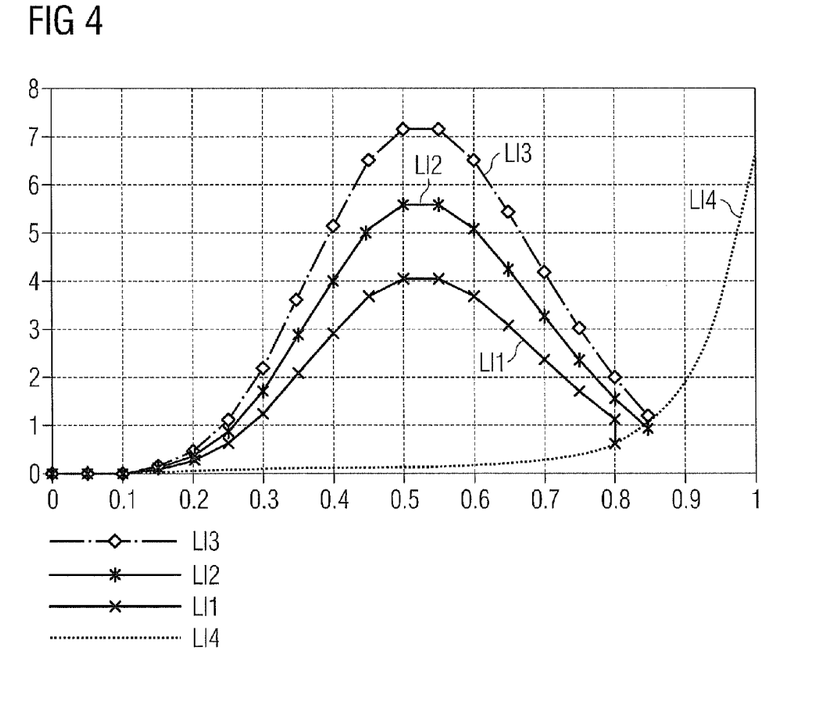
FIG. 4 a diagram which illustrates the results of the inventive method based on a benchmark problem.

FIG. 4 shows results of the simulation based on BurnSim for exploration of the state space. In this case the fuel supply f is plotted in FIG. 4 along the abscissa and the humming h is reproduced along the ordinate. The line LI1 shows the exploration limit of pathfinding based on reinforcement learning, the line LI2 shows the exploration limit based on graph-based pathfinding and the line LI3 shows the limit of the rewards $\tau=-1$. The states lying below the lines LI1 and LI2 are states which must be achieved with the corresponding pathfinding method. The states below the limit in accordance with the line LI3 represent the maximum safely explorable states. In addition the achievability limit is shown as the dotted line LI4, i.e. all states to the right of the line are not reachable in the BurnSim problem. The line LI4 in this case is the projection of the line L1 of FIG. 2 in the plane spanned by the axes f and h.

In the use of the graph-based exploration the local quadratic approximation has backup been used and the standard adjuster described above $\pi^{backup}$ was employed as a backup policy. As emerges from FIG. 4 the limit for $\tau=-1$ was not exceeded during the exploration so that the exploration fulfils the criteria of safe exploration.

In the exploration with state aggregation and RL pathfinding the local quadratic approximation was used as the safety function as with the graph-based exploration. The backup policy involves a policy which, as described above, was determined from the teacher trajectory T of FIG. 3. The area explored in this pathfinding is smaller than the area covered by the graph-based exploration, since the line LI1 lies below the line LI2.

In many areas of the state space the teacher trajectory used for learning does not contain any alternate actions but just one non-optimum action. For lack of alternates in the training data the resulting policy also selects this action. The result is a backup policy which reduces the humming more slowly than the standard adjuster. This means that lower rewards are observed on the backup trajectories of this policy than on those of the standard adjuster. As a result the safety function classifies earlier actions as unsafe.

Despite the smaller area covered relative to graph-based exploration, information is obtained from the entire area of the state space which is entered by the trajectory of the optimum policy. Thus the observations are sufficient in this case to derive the optimum policy from this. The optimum policy in this case is that action and selection rule which on average delivers the highest rewards. This policy is known for the BurnSim problem.

The graph-based exploration required approximately 52,000 steps until no further exploration was possible. In the case of exploration of aggregated steps with RL pathfinding on the other hand, approximately 98,000 steps were needed. The reason for the larger number of exploration steps is the learned backup policy less suitable for exploration as well as the lack of safety in the pathfinding because of the violation of the Markoff condition by the state aggregation.

To verify the performance of the method the data determined with the exploration method described above was used for learning the optimum policy. Different RL methods were employed for this learning. In particular the neural fitted Q iteration, dynamic programming with closest neighbor generalization and the known optimum policy were compared. The following Table 1 depicts the average rewards reached from two RL methods compared to the optimum policy, with both RL methods being executed both with graph-based and also with RL pathfinding.

TABLE 1

| RL method | Average reward | |
|---|---|---|
| | Graph-based | RL path finding |
| Dynamic programming | 1.164 | 1.132 |
| Neural Fitted Q-Iteration | 1.166 | 1.166 |
| Optimum policy | 1.166 | |

It can be seen from Table 1 that both exploration with graph-based pathfinding and also with RL pathfinding leads to policies with rewards which lie close to the reward of the optimum policy or even correspond to the latter. In particular the optimum policy was determined with the neural fitted Q iteration both for the graph-based and also for the RL pathfinding.

It emerges from the information given above that the inventive method enables the states of a technical system to be explored very well to the extent that a good database is achieved with which the corresponding control or adjustment methods for the technical system can be learnt. In this case it is especially avoided in the exploration that states are reached which can lead directly or indirectly to damage to the technical system.

The invention claimed is:

1. A method for computer-assisted exploration of states of a technical system, comprising:
running consecutive states of the technical system by an action whereby executing the action in a respective state leads to a new state being executed;
using a safety function to determine whether the action is a permissible or impermissible action in the technical system before an execution of the action leads to an unknown state not previously run, with the action only being executed if the action is permissible; and
selecting a subsequent action based on a backup policy when reaching the unknown state in order to return the state to a known state whereby a known state is a previously run state,
wherein the action executed is assigned a reward as a function of the state in which the action is executed, and
wherein the new state is reached by the action,
wherein the impermissible action features the reward which is smaller than a prespecified value,
wherein the safety function is learned based on a plurality of rewards of a plurality of actions, and
wherein a pair comprising the state and the action executed in the state run are assigned a minimum reward which after the execution of the action and on subsequently running the backup policy occurs for the action,
wherein the safety function is determined based on the minimum reward, and
wherein the safety function establishes the impermissible action if the minimum reward is smaller than the prespecified value.

2. The method as claimed in claim 1, wherein the impermissible action is characterized such that, on execution of the impermissible action, the technical system has a probability of one or a probability of greater than zero of going into the state which leads to an undesired and/or incorrect operating state of the technical system directly after the execution of the impermissible action or indirectly after the execution of a plurality of further actions.

3. The method as claimed in claim 1, wherein when the state of the technical system is reached in which the action to be executed is classified by the safety function as impermissible, the subsequent action will be selected based on the backup policy.

4. The method as claimed in claim 1, wherein the safety function is determined with a function approximator which approximates the minimum reward based on a local extrapolation by the state currently to be changed with the action.

5. The method as claimed in claim 4, wherein the function approximator carries out a local-linear and/or local-quadratic extrapolation.

6. The method as claimed in claim 1, wherein the backup policy is a policy prespecified for the technical system.

7. The method as claimed in claimed 6, wherein the backup policy is realized by an existing adjuster of the technical system.

8. The method as claimed in claim 1, wherein the backup policy is determined with a reinforcement learning method based on the plurality of rewards of the plurality of actions.

9. The method as claimed in claimed 8, wherein the reinforcement learning method is based on an optimality criterion in accordance with which a minimum of the expected value of all future rewards is maximized.

10. A method for computer-assisted exploration of states of a technical system, comprising:
running consecutive states of the technical system by an action whereby executing the action in a respective state leads to a new state being executed;
using a safetysafely function to determine whether the action is a permissible or impermissible action in the technical system before an execution of the action leads to an unknown state not previously run, with the action only being executed if the action is permissible; and
selecting a subsequent action based on a backup policy when reaching the unknown state in order to return the state to a known state whereby a known state is a previously run state,
wherein on running the plurality of states, the plurality of states are assigned to consecutive categories such that if the plurality of states are changed based on the backup policy an unknown, previously not yet run state reached by the action is assigned a category which the state is assigned before the execution of the action or in all other cases an unknown, previously not yet run state reached by the action is assigned the category which follows the category which the state is assigned before the execution of the action.

11. The method as claimed in claim 10, wherein the plurality of states are run according to a plurality of categories such that in one category all possible actions to be executed are first explored and subsequently a transition is made to the next category.

12. The method as claimed in claim 11,
wherein the plurality of states of the category are run with a graph-based pathfinder method in which during the running of the plurality of states a graph is constructed
wherein a plurality of nodes on the graph correspond to the plurality of run states, and
wherein a plurality of edges on the graph correspond to the plurality of executed actions, and
wherein for each node the category of the corresponding state is stored, whereby on reaching the state, in which all possible actions have already been explored, a search is made in the graph for a path to the state in a same category, in which actions can still be explored, and on finding such path to the state, this path is taken.

13. The method as claimed in claim 12, wherein in an event of no path to the state in the same category being found in which actions can still be executed, the plurality states of the following category are run.

14. The method as claimed in claim 11, wherein the plurality of states of a category are run with the reinforcement learning method based on a reward function, whereby in accordance with the reward function the action is assigned a reward when it leads to the state in the category just run in which an exploration of the action is possible.

15. The method as claimed in claim 14, wherein in the reinforcement learning method an action selection rule is updated after running a predetermined number of states, whereby the newly added actions and the respective state in which the newly added action is executed as well as the new state reached by the action are taken into account in the updating.

16. The method as claimed in claim 10, wherein in the graph-based pathfinder method and in the reinforcement learning method similar states of the technical system are grouped into a plurality of common clusters.

* * * * *